United States Patent Office 2,995,513
Patented Aug. 8, 1961

2,995,513
FLOCCULATION BY STARCH ETHERS
Eugene F. Paschall, Orland Park, and William H. Minkema, La Grange, Ill., assignors to Corn Products Company, a corporation of Delaware
No Drawing. Filed Dec. 31, 1957, Ser. No. 706,277
3 Claims. (Cl. 210—54)

This invention relates to the preparation of cationic quaternary ammonium ethers of starch which have unusually high capacity for flocculating materials suspended in aqueous systems.

In copending application, Serial No. 631,429, now U.S. Patent No. 2,876,217, March 3, 1959, processes are described for preparing gelatinizable quaternary ammonium ethers of starch in granule form; that is the native structure of the starch granule is maintained during both the preparation and purification steps. The granular products obtained are gelatinizable in water. As described in the above copending application, introduction of quaternary ammonium groups to starch converts the latter to a cationic polymer. A formal positive charge is retained by the quaternary ammonium starch ether at both alkaline and acid pH values. These cationic products were found to flocculate a variety of negatively charged polymers such as anionic starch and cellulose. In addition, aqueous suspensions of various clays, silt in river waters as well as aqueous suspension of particles of iron ore, coal and carbon, which are believed to carry a partial negative charge, were flocculated by said quaternary ammonium ethers of starch. Flocculation is believed to result from the electro-chemical attraction of the positively charged group on starch with the negatively charged suspended body to form aggregates of sufficient particle size to settle from suspension.

Several disadvantages were noted, however, when the cationic starches prepared in granule form and gelatinized for use were compared with some of the currently used industrial flocculating agents. Comparative tests showed that the above cationic starches not only possessed a considerably lower flocculating capacity but also they formed large sticky agglomerates which were difficult to separate by filtration because of clogging of the filter pad. The latter difficulty is attributed to the excessive amounts of cationic starch employed to induce complete flocculations and settling. Thus, even though the cationic starches prepared in granular form are considerably less expensive than other industrial flocculating agents, they generally cannot compete with the latter on a cost versus capacity basis.

The main object of this invention is to provide a process for the preparation of cationic quaternary ammonium ethers of starch possessing unusually high flocculating capacity. A further object is to provide a process for the preparation of substantially noncross-linked cationic ethers of starch from gelatinized starch. A further object is to prepare new and useful flocculating agents in a simple and economical manner. Yet another object is to prepare new flocculating agents which will floc materials in aqueous systems over a wide pH range. Yet another object is to prepare flocculating agents which form a permanent floc with the suspended materials and also achieve quantitative separation of the suspended materials and water. Still another object is to provide a new process for clarifying industrial waters, tailings from various mining operations and the like. Still another object is to provide a new process of treating slurries, e.g., clay slurries, containing high solids concentrations to prevent the formation of non-uniform agglomerates. Other objects will appear hereinafter.

We have now made the suprising discovery that quaternary ammonium starch ethers possessing a greatly improved flocculating capacity can be prepared by reacting starch in the pasted form with a purified reaction product of epichlorohydrin and a tertiary amine or a tertiary amine salt (e.g., a salt such as is obtained by treating a reactive tertiary amine with an acid such as hydrochloric, sulfuric, phosphoric, etc.). By this, the flocculating capacity at any D.S. level (D.S.=degree of substitution) can be increased by as much as 7 to 10 fold compared to the capacity of the quaternary ammonium starch ether prepared in granule form.

These new cationic starch ethers are superior to the best performing flocculating agents now on the market in several respects, namely they are cheaper to make, have greater capacity to flocculate over a broader pH range; they form permanent flocs and achieve quantitative separation of suspended materials from aqueous systems.

The flocculating capacity of the quaternary ammonium starch ethers of this invention appears to increase with degree of substitution up to a level of about 0.4–0.5 D.S. Beyond this the capacity appears to level off and increase slightly with D.S., although we do not wish to be bound by any upper D.S. limit. A practical operating D.S. range is about 0.3 to about 0.5.

Tertiary amines most suitable for our invention may be represented by the formula

wherein $R_1$, $R_2$ and $R_3$ are from the group consisting of alkyl, substituted alkyl, aryl and aralkyl; also, two of the R's may be joined to form a heterocyclic, or a homocyclic ring compound. The total number of carbons in all three of $R_1$, $R_2$ and $R_3$ should not exceed about 14 carbons. If all three of $R_1$, $R_2$ and $R_3$ are not the same and $R_3$ contains more than 3 carbon atoms but 12 or less, then $R_1$ and $R_2$ should preferably be from the group consisting of methyl and ethyl and if $R_1$ and $R_2$ are joined to form a ring compound, $R_3$ should preferably not be greater than ethyl.

The reaction between epichlorohydrin and the tertiary amine or the amine salt or a mixture of the two results in compounds which may be represented by the formula

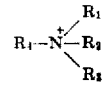

wherein $R_4$ is 2, 3 epoxypropyl if the free amine is used, or $R_4$ is 3 halo 2 hydroxypropyl if the salt of the tertiary amine is employed or $R_4$ is a mixture of 2, 3 epoxypropyl and 3 halo 2 hydroxypropyl if a mixture of the free amine and the amine salt is used. For the sake of simplicity these reagents will be referred to hereinafter as epichlorohydrin tertiary amine addition products.

The greatly improved flocculating results are achieved only if: (1) the starch is gelatinized completely either during the early stages of etherification or prior to etherification and (2) the epichlorohydrin-tertiary amine addition product is purified prior to reaction with starch as described in the example to follow. The most improved flocculating results are obtained, however, if the starch is gelatinized completely prior to etherification.

Both steps are essential to the preparation of a quaternary ammonium starch ether possessing the above-mentioned greatly improved flocculating capacity. If the epichlorohydrin-tertiary amine reaction product is not purified prior to reaction, the product is adversely affected in two ways: First, crosslinking by unreacted epichlorohydrin causes the starch paste to set to a solid or semi-solid gel depending on the concentration of starch paste in the reaction mixture. This gel is not only difficult to remove from the reaction vessel but also it is of such cohesive character that it is difficult and in some cases impossible to redisperse in water. Secondly, and of greater practical significance, cross-linking of starch by unreacted epichlorohydrin normally remaining in the reagent mixture results in a product having a greatly reduced flocculating capacity. Instead of a 7 to 10 fold increase in flocculation capacity over that possessed by granular cationic starch, the cross-linked products are in most instances even inferior to uncross-linked products prepared in granule form. None were found to possess the high flocculating capacity of the products of this invention. We have found it impossible to control the reaction of epichlorohydrin with any tertiary amine by and manner of mixing, so that a substantially epichlorohydrin free reaction product is formed. That is, sufficient epichlorohydrin always remains so that the products are adversely affected in the manner stated above when the addition product is allowed to react with starch in the presence of a strong alkaline catalyst. We have discovered, however, that by subjecting the epichlorohydrin-tertiary amine reaction mixture to vacuum evaporation or solvent extraction, detrimental amounts of epichlorohydrin can be removed therefrom so that cross-linking does not occur to any detrimental extent when the reagent is allowed to react with a pregelatinized starch.

As tertiary amines, we prefer to use those possessing at least two and preferably three methyl groups attached directly to nitrogen because of their superior reactivity with epichlorohydrin to form the desired reagent. Also, they are less expensive. High reactivity is retained even when the third group of the tertiary amine contains as many as 18 carbon atoms. This high reactivity is believed to result from the lower order of steric hindrance possessed by the two methyl groups, allowing for intimate contact of epichlorohydrin with the free election pair of the tertiary amine nitrogen. By way of illustration the following tertiary amines may be mentioned as particularly suitable for carrying out this invention; trimethylamine, dimethylbenzylamine, triethylamine, N-ethyl and N-methylmorpholine, N-ethyl and N-methylpiperidine, and dimethylcyclohexylamine.

In carrying out the process of our invention, the previously described reagents may be prepared by mixing equimolar quantities of epichlorohydrin and the tertiary amines or tertiary-amine salts or mixtures of the two in an aqueous system and allowing the reaction to proceed preferably with agitation until the formation of the reagent is complete. When employing tertiary-amine salts in the reagent preparation, somewhat higher reaction temperatures are generally desirable for a particular amine to speed up the reaction. Also, when using the amine salt for reagent preparation, the pH of the aqueous solution should be at least about 5, that is, a small amount of the free amine should be present.

The resultant addition product may be purified, as desired, by vacuum evaporation or solvent extraction to remove unreacted epichlorohydrin. More details as to procedure of preparation and purification of the reagent are set forth in the examples to follow.

In order to prepare the quaternary ammonium starch ethers of this invention, a purified epichlorohydrin reaction product is mixed with a starch paste of workable viscosity and a strongly alkaline catalyst is added to the mixture to promote the reaction. The order of mixing, however, is not critical. The reaction is generally spontaneous, i.e., occurs at room temperature; however, heat and increased amounts of catalyst increase the reaction rate. The upper limit with respect to alkali concentration and reaction temperature generally is fixed by the stability of the starch to be reacted. For example, a highly converted acid-modified starch degrades much more readily than an unmodified starch in the presence of alkali at elevated temperatures; thus, the latter starch can tolerate a higher reaction temperature and alkali concentration to increase the reaction rate than an acid-, enzyme-, or chlorine-converted starch. Alkali concentration and reaction time are interdependent in the sense that a high reaction temperature and a low alkali concentration or a high alkali concentration and a low reaction temperature may be employed to produce cationic starches at about the same over-all reaction efficiency.

The quaternary ammonium starch ethers obtained may be purified, if desired, by any of the conventional methods for purifying a pasted starch product. They may be recovered by flocculating with an organic solvent or the pasted products may be dewatered by roll- or spray-drying and the dry product washed free of impurities with an organic solvent. Alternately, impurities may be removed by dialysis. We have found, however, that it is not necessary to recover the product in a pure form to obtain the greatly improved flocculating results, i.e., the impure paste may be used as is.

A wide variety of alkaline compounds may be used as catalysts in our invention. These include the alkali metal hydroxides, alkaline earth oxide and hydroxides and quaternary ammonium bases.

The amount of etherification catalyst which gives satisfactory results in producing quaternary ammonium starch ethers of high flocculating capacity may vary over a wide range. As mentioned previously, the stability of the starch to be reacted in many instances determines the upper limit of alkali concentration. Generally, we find that alkali concentrations ranging from about 0.1 to 0.5 mole per mole of starch are operable, however, we prefer to use about 0.2–0.3 moles. When using the latter range of concentrations, a reaction temperature of from 40–65° C. is preferred.

Our invention is applicable to all starches and starch fractions but is particularly applicable to acid- or enzyme-modified corn and waxy starches. Specifically, it is applicable to corn, potato, tapioca, sago, rice, wheat, waxy maize, grain sorghum, grain starches in raw or modified forms, e.g., modified with acid oxidizing agents and the like. It is also applicable to amylose and amylopectin, the linear and branched components, respectively, of corn starch. It is also applicable to dextrans prepared, for example, from either sucrose and the polymerizing enzyme, *Leuconostoc mesenteroides* or from 10–20 D.E. starch hydrolyzate and the polymerizing enzyme, *Acetobacter capsulatum*.

EXAMPLE 1

This example illustrates the preparation of a 0.225 D.S., 80-fluidity white milo quaternary ammonium starch either from the epichlorohydrin-trimethylamine hydrochloride addition product.

*Reagent preparation.*—One mole of HCl in 515 ml. of water was neutralized to pH 9.1 with a 24 percent aqueous solution of trimethylamine. One mole of epichlorohydrin (81 ml. of 97 percent solution) was added and the solution stirred 1.0 hour. During this time, the temperature of the solution rose from 38 to 45° C. Then 0.1 mole of NaOH was added to raise the pH of the solution from 7.7 to 9.6, and 30 minutes later a second 0.1 mole increment of NaOH was added to raise the pH to 10.4. The solution was then evaporated under vacuum at 40–50° C. until the volume had been reduced from 900 to about 200 ml. Then, 0.8 mole of NaOH in 100 ml. of water was added and the solution stirred 15 minutes. One-half of the solution (205 ml.) was then used to etherify pasted 80-fluidity white milo corn starch.

*Starch etherification.*—One mole of 80-fluidity acid converted white milo starch (180 grams at 12 percent moisture) was cooked 15 minutes in 468 ml. of water. The clear viscous paste was cooled to 60° C. and 0.1 mole of NaOH in 50 ml. of water and the above iliquot of reagent were added. The paste was stirred 19 hours at 45° C. A viscous amber product resulted. Without neutralization the pure product was recovered by first precipitating the product with methanol and then washing with absolute ethanol. After drying over sulfuric acid, the product was found to contain 1.61 percent nitrogen (d.b.) equivalent to a degree of substitution of 0.225. The product possessed an unusually high capacity for flocculating a 0.5 percent suspension of coating clay stabilized with tetra-sodium pyrophosphate, i.e., about 8 pounds of the derivative per ton of suspended clay resulted in complete flocculation and settling of the clay.

EXAMPLE 2

One-half of the reagent prepared in Example 1 was used to etherify 80-fluidity acid-modified corn starch. The same conditions employed in Example 1 were used for starch derivatization. The product was found to contain 1.63 percent (d.b.) nitrogen, equivalent to a D.S. of 0.23. The product possessed an unusually high capacity for flocculating a 0.5 percent suspension of coating clay stabilized with tetra-sodium pyrophosphate, i.e. 8.9 pounds of derivative per ton of suspended clay resulted in complete flocculation and subsidence of the clay.

EXAMPLE 3

This example illustrates the preparation of a 0.5 D.S. quarternary ammonium starch ether from pregelatinized 80-fluidity acid-modified corn starch using a mixture of trimethylamine and trimethylamine hydrochloride for reagent preparation.

*Reagent preparation.*—Two-tenths mole of HCl in 102.6 ml. of solution was added to 1.0 mole of $(CH_3)_3N$ in 511 ml. of water. Then, 1.0 mole (81 ml.) of epichlorohydrin was added and the solution stirred at 27° C. for 2 hours (final pH was 9.35). The clear one-phase solution was vacuum evaporated at 30–35° C. until the volume was reduced from 800 to 230 ml. The reagent was used to etherify 80-fluidity acid-modified corn starch.

*Starch etherification.*—One mole (180 grams at 12 percent moisture) of 80-fluidity acid-modified corn starch was cooked 15 minutes in 468 ml. of water. The starch was completely gelatinized. The hot paste was cooled to 45° C. and the reagent added while vigorously agitating, then 0.4 mole of NaOH in 30 ml. of water was added. The reaction mixture was stirred 21 hours at 45° C. then neutralized to pH 5.0 with 0.32 mole HCl. The pure product was isolated by precipitating with a mixture of methanol and ethanol, blending the precipitate with absolute ethanol, then filtering and washing the filter cake with ethanol and finally drying in vacuo over concentrated sulfuric acid. The product contained 2.88 percent nitrogen, equivalent to a D.S. 0.5.

A 0.5 percent paste of the product was used to flocculate a 0.5 percent suspension of unstabilized clay. Based on suspended clay, only 0.18 percent of starch was required to flocculate completely all of the clay. A partially carboxylated polyacrylamide flocculating agent used at the same concentration only partially flocculated the suspended clay.

EXAMPLE 4

This example illustrates the preparation of a 0.58 D.S. quaternary ammonium starch ether from 80-fluidity white milo starch.

Reagent preparation and starch etherification was performed in the same manner as described in Example 3. The degree of substitution of pure product was 0.58.

A paste of this product was unusually effective for flocculating a water suspension of coal dust. Only 0.1–0.5 percent quaternary ammonium starch ether (based on suspended solids) was required to flocculate completely a suspension of coal dust (screened to pass 60 mesh) leaving a clear supernatant liquid.

Between 0.1 and 0.15 percent of the above product flocculated completely the clay in a 0.5 percent suspension of unstabilized coating clay.

EXAMPLE 5

This example illustrates the preparation of a high D.S. quaternary ammonium starch ether using $Ca(OH)_2$ as the etherification catalyst.

The epichlorohydrin-trimethylamine addition product was prepared and purified in the same manner as in Example 3.

One mole of 60-fluidity acid-modified corn starch was cooked 20 minutes in 550 grams of water. The starch paste was cooled to 85° C. and 0.25 mole of $Ca(OH)_2$ added while stirring. After cooling the alkaline starch paste to 70° C., one mole of epichlorohydrin-trimethylamine reagent (based on epichlorohydrin) was mixed with the paste. The reaction mixture was stirred 16 hours at 45° C., then 200 ml. of methanol added to thin the product. Product was neutralized from pH 11.9 to 7.0 with 0.43 mole HCl. Sufficient ethanol was then added to precipitate quantitatively the cationic starch. The precipitate was blended in absolute ethanol until in a finely divided form, using a Waring Blendor, then filtered and the filter cake washed with two portions of ethanol. Finally, the product was dried in vacuo over $H_2SO_4$. The dried product weighed 213 grams (d.b.). Nitrogen analysis by the Kjeldahl method showed 2.82 percent, equivalent to a 0.48 D.S. product. The product was unusually effective in flocculating a 0.5 percent suspension of coating clay stabilized with tetrasodium pyrophosphate, i.e., only 5.6 pounds of cationic starch per ton of clay were required to flocculate the suspended solids leaving a clear supernatant liquid.

EXAMPLE 6

This example illustrates the preparation of a 0.2 D.S. quaternary ammonium starch ether from the epichlorohydrin-dimethylbenzylamine reaction product. Twenty-five hundredths mole (0.25) of N,N-dimethylbenzylamine was added to 0.25 mole of epichlorohydrin in 250 ml. of water. The solution was stirred 2.5 hours and then allowed to stand overnight. The clear solution was vacuum distilled at 33° C. until the volume was reduced to 100 milliliters.

One-half mole of 80-fluidity acid-modified corn starch was gelatinized in 324 ml. of water. The paste was cooled to 57° C. and the reagent added. After cooling to 45° C., 0.15 mole NaOH in 25 ml. of water was added and the paste stirred 16 hours at 44° C. The paste was neutralized from 12.9 to 7 with HCl. The quaternary ammonium starch was isolated in the usual manner by methanol precipitation. Analyses on the pure product showed the presence of 1.4 percent nitrogen (d.b.) equivalent to a D.S. of 0.19.

The product was only slightly less effective than a 0.2 D.S. product prepared similarly from epichlorohydrin-trimethylamine reagent for flocculating a 0.5 percent suspension of stabilized coating clay.

EXAMPLE 7

This example illustrates the preparation of a 0.2 D.S. quaternary ammonium starch ether from N,N-dimethyldodecylamine.

For this product, conditions for reagent preparation and starch etherification were the same as those employed in Example 6. Nitrogen analysis showed the product to be 0.2 D.S. This product was less effective than a 0.2 D.S. quaternary ammonium starch prepared similarly from the epichlorohydrin-trimethylamine addition product for flocculating a 0.5 percent sol of stabilized coating clay. About 20 pounds of derivative per ton of clay were required to flocculate the suspended clay leaving a clear supernatant liquid.

EXAMPLE 8

This example illustrates the preparation of a 0.2 D.S.

quaternary ammonium amylose ether from the epichlorohydrin-trimethylamine reagent.

Six-hundredth mole of a epichlorohydrin-trimethylamine reagent prepared and purified according to previously described procedures was added to 0.10 mole of amylose dispersed in 200 ml. of water containing 0.03 mole NaOH. The paste was stirred 24 hours at 45° C., and neutralized from pH 11.9 to 7.0 with 0.025 mole HCl. The paste was freeze-dried and thoroughly washed with 90 percent methanol.

Analysis showed the presence of 1.41 percent nitrogen, equivalent to a D.S. of 0.19. The product showed about the same capacity for flocculating a 0.5 percent suspension of stabilized coating clay as a 0.205 quaternary ammonium starch prepared from 80-fluidity corn starch.

EXAMPLE 9

This example illustrates the preparation and attempted use of a 0.45 D.S. quaternary ammonium starch ether prepared from an impure epichlorohydrin-trimethylamine addition product.

One-half mole of the epichlorohydrin-trimethylamine reagent was prepared according to the procedure of Example 1 except that the reagent was not purified as by vacuum evaporation. The volume of the impure reagent was about 300 ml.

One-half mole of roll-dried, pregelatinized 80-fluidity acid-modified corn starch was dispersed in the aqueous solution of the impure reagent and 0.12 mole of NaOH added. The paste was placed in a 45° C. bath and heated at this temperature for 18 hours. During reaction the paste set to a solid gel. The gel was disintegrated by blending with methanol in a Waring Blendor. The resulting slurry was treated with additional methanol until complete flocculation occurred judging from the clearness of the supernatant liquid. The precipitate was then washed thoroughly with ethanol. Analysis showed the presence of 2.75 percent nitrogen (d.b.) equivalent to a D.S. of 0.453.

The product when heated in water at 0.5 percent solids formed a turbid sol containing undispersed particles of gel. The sol would not flocculate a 0.5 percent suspension of stabilized coating clay when used at a concentration as high as 2 percent based on clay. A 0.45 D.S. quaternary ammonium product similarly prepared from the purified reagent induced complete flocculation of clay in the above system when used in amounts as low as 0.15 percent based on clay. Thus, the latter product was more than ten times as effective a flocculent as the product prepared from the impure reagent.

EXAMPLE 10

This example illustrates the preparation of a high D.S. quaternary ammonium starch ether from the epichlorohydrin-triethylamine addition product.

*Reagent preparation.*—One mole of triethylamine, 139 ml., was added to 948 ml. of water then 0.1 mole of HCl in 52.1 ml. of water was added. While stirring, 1 mole of epichlorohydrin, 81 ml., was added and the solution stirred 16 hours at 30° C. The solution was vacuum evaporated at 45° C. until the volume of the solution was reduced to 230 ml. The pH was 10.8.

*Starch etherification.*—The above purified epichlorohydrin-triethylamine reagent was reacted with 1 mole of pregelatinized 60-fluidity acid-modified corn starch. The starch paste contained 0.3 mole of NaOH and 518 ml. of water. The reaction time and temperature were 16 hours and 45° C., respectively. The paste was neutralized to pH 7 with HCl and then isolated and purified according to the procedure of Example 5. The degree of substitution was 0.53. Only 0.15 percent (based on clay solids) of the product (dry basis) was required to flocculate completely a 0.5 percent suspension of unstabilized coating clay.

EXAMPLE 11

This example illustrates the preparation of a high D.S. quaternary ammonium starch ether from the epichlorohydrin-N-ethylpiperidine addition product.

*Reagent preparation.*—Starch etherification and purification of the product were performed according to the procedure of Example 10, using the same parent starch.

The product contained 2.46 percent nitrogen based on Kjeldahl nitrogen analysis. Only 0.18 percent of the product (based on clay) was required to flocculate completely a 0.5 percent suspension of unstabilized coating clay.

EXAMPLE 12

This example illustrates the preparation of a quaternary ammonium starch ether from alkali gelatinized high amylose corn starch. The reagent was prepared from epichlorohydrin and trimethylamine hydrochloride.

A 24 percent aqueous solution of trimethylamine, 0.52 mole, was added to 0.50 mole HCl in 236 ml. of solution. The pH of the solution was 9.0. Then, 0.5 mole of epichlorohydrin was added and the solution stirred one-half hour at 25°–27° C. An additional 0.035 mole of $(CH_3)_3N$ was added and the solution stirred an additional 15 minutes at 25° C. The reagent was purified by vacuum evaporation at 45° C.

Ninety grams, 0.5 mole, of high amylose corn starch, 60 percent amylose, was stirred in 400 ml. of water containing 0.40 mole NaOH. The paste was cooled in the refrigerator 24 hours to ensure complete gelatinization of the starch without degradation. The above reagent was mixed into the paste. Then, 0.2 mole NaOH in 150 ml. of water was added and the alkaline paste stirred 16 hours at 45° C. After diluting with one liter of methanol, the paste was neutralized from pH 12.1 to 7.0 with HCl.

The product was precipitated with alcohol and washed in the usual manner. Degree of substitution of the product was 0.3. The product induced complete flocculation of a suspension of coating clay, stabilized with tetrasodium pyrophosphate, when 4.8 pounds of starch derivative per ton of suspended clay was employed.

EXAMPLE 13

This example illustrates the preparation of a quaternary ammonium starch ether from alkali gelatinized starch using a reagent prepared at 14–16° C. from a mixture of trimethylamine and trimethylamine hydrochloride.

Five-tenths mole of epichlorohydrin was added dropwise to a solution of 0.5 mole of trimethylamine in 387 ml. of water containing 0.3 mole HCl. The solution was stirred in a closed container for 90 minutes at a temperature of 14°–16° C. After reaction, the pH was 8.3. The impure reagent was vacuum evaporated, at 45° C., to a thick syrup.

Five-tenths mols of 60-fluidity acid modified corn starch, 90 grams at 12 percent moisture, was slurried in 100 ml. of water. Then, 0.375 mole NaOH in 40 ml. of water was mixed into the slurry. The paste was stirred for 2 hours at 55° C. to obtain a workable viscosity. The above reagent was mixed with the paste and the reaction mixture heated 16 hours at 50° C. without agitation. The product, a viscous gel, was diluted with 500 ml. of water and neutralized from pH 11.4 to 7.3 with 0.19 mole HCl. The product was recovered with alcohol in the usual manner. The D.S. of the product was 0.66. About 4.0 pounds of product per ton of tetrasodium pyrophosphate stabilized clay suspension induced complete flocculation of the clay.

EXAMPLE 14

This example illustrates the preparation of quaternary ammonium starch ether from pregelatinized 60-fluidity acid modified corn starch using the dimethylcyclohexylamine-epichlorohydrin reagent.

One mole of 60-fluidity acid converted corn starch, 180 grams at 12 percent moisture, was pasted in 450 ml. of water using a steam bath. The paste, in a one-liter reaction flask, was cooked 15 minutes and cooled to 60° C. Then 0.3 mole of NaOH in 60 ml. of H₂O was added. The paste was then cooled to 47° C. and the reagent added. The reaction mixture was stirred 16 hours at 45° C. After reaction, 700 ml. of methanol was added to dilute the reaction mixture and the pH was adjusted from 12.4 to 7.0 using HCl. The product was precipitated with alcohol and worked up in the usual manner. The purified product was dried to 94 percent dry substance. The D.S. of the product was 0.53. About 4.3 pounds of product per ton of stabilized clay induced complete flocculation of the suspended clay.

EXAMPLE 15

This example illustrates the preparation of a quaternary ammonium starch ether from pregelatinized 60-fluidity acid modified corn starch and the epibromohydrin-trimethylamine addition product.

One-third mole of aqueous trimethylamine, 86 ml. was added to 167 ml. of water containing 0.066 mole HCl at 10° C. Then, one-third mole of epibromohydrin was added to the solution. During reaction the temperature rose to 16° C. The solution was stirred 2.5 hours. The reagent was vacuum evaporated until a viscous tan syrup remained. The pH of the solution before purification was 9.25 and after evaporation the pH was 9.9.

One-third mole of 60-fluidity acid modified corn starch, 60 grams at 12 percent moisture, was gelatinized in 150 ml. of water by cooking 15 minutes at 97° C. Then, 0.08 mole of NaOH in 16 ml. of water was added dropwise as the paste was cooled from 70° to 50° C. The reagent was added at 50° C., and the paste stirred 16 hours at 50° C. The paste was diluted with 100 ml. of water and stirred an additional 2 hours. The product was neutralized from pH 11.6 to 7.0 with 0.051 mole HCl. The product was recovered with alcohol in the usual manner. The D.S. of the derivative was 0.41. This product was also highly effective in flocculating a stabilized clay. About 5.5 pounds of derivative per ton of suspended clay induced complete flocculation leaving a clear supernatant liquid.

EXAMPLE 16

This example shows the influence of D.S. on flocculating capacity. In the data in Table I below, the flocculating capacity refers to the pounds of quaternary ammonium starch ether (dry basis) prepared in accordance with Example 3, required to flocculate completely one ton of clay in a 0.5 percent suspension of coating clay stabilized with tetrasodium pyrophosphate. This system is difficult to flocculate, requiring 15–20 times more flocculent than an unstabilized suspension of the same clay.

Table I

| Experiment No. | Parent starch | D.S. | Flocculating capacity, pounds per ton of suspended solids |
|---|---|---|---|
| a | Raw corn starch | 0.18 | 11.0 |
| b | 40-F corn | 0.20 | 10.0 |
| c | 10-F corn | 0.25 | 9.0 |
| d | 60-F corn | 0.38 | 5.6 |
| e | do | 0.47 | 5.6 |
| f | 80-F white milo | 0.58 | 5.5 |
| g | 60-F corn | 0.57 | 5.0 |

EXAMPLE 17

This example illustrates the improvement in flocculating capacity of cationic starch achieved by derivatizing starch in the pasted form instead of the granule form.

PREPARATION OF 0.8 D.S. QUATERNARY AMMONIUM STARCH IN GRANULE FORM FROM EPICHLOROHYDRIN-TRIMETHYLAMINE

One mole of epichlorohydrin-trimethylamine reagent was prepared and purified by the procedure of Example 3.

A starch slurry was prepared consisting of one mole of raw corn starch, 180 grams at 10 percent moisture, 0.42 mole Na₂SO₄ and 0.1 mole of NaOH in 250 ml. of water. The above purified reagent was added and the slurry stirred 48 hours at 50° C. The product was neutralized from pH 11.3 to 7.0 with HCl and filtered. The filter cake was reslurried in 75 percent aqueous methanol and filtered. This procedure was repeated three times to eliminate inorganic salts from the product. The D.S. of the product was 0.29.

The minimum amount of this product, after gelatinization, to induce complete flocculation of coating clay stabilized with tetrasodium pyrophosphate was 53 pounds of derivative per ton of suspended clay.

A 0.29 D.S. quaternary ammonium starch prepared from pregelatinized starch according to the procedure of Example 3 was tested on the above slime. Only 8.0 pounds of this product was required to effect complete flocculation of the suspended clay. Thus, quaternary ammonium starch prepared from pasted starch, using the same purified reagent, is about 7 times more effective in flocculating the above clay suspension than a product prepared at the same D.S. level in the granule form.

EXAMPLE 18

This example illustrates the use of quaternary ammonium starch as a flocculating agent for titanium dioxide dispersed in water.

A 0.48 D.S. derivative prepared according to the procedure of Example 3 was used to flocculate a 0.5 percent dispersion of titanium dioxide pigment used commercially as a filler in paper making. About one pound of quaternary ammonium starch per ton of TiO₂ solids completely flocculated the suspended TiO₂ leaving a clear supernatant liquid.

EXAMPLE 19

This example illustrates the use of quaternary ammonium starch as a flocculating agent for a Minnesota, non-magnetic soft iron ore slime. The product of Example 4 was used for the test. About 0.2 pound of quaternary ammonium starch per ton of iron ore solids completely flocculated the suspended solids leaving a clear supernatant liquid.

EXAMPLE 20

This example illustrates the use of a quaternary ammonium starch as a flocculating agent for carbon black. The derivative of Example 4 was employed for the test. A 0.5 percent suspension of decolorizing vegetable carbon was flocculated completely with 2.2 pounds of quaternary ammonium starch per ton of suspended slime leaving a clear supernatant liquid.

EXAMPLE 21

A quaternary ammonium starch ether having a D.S. of 0.26 was prepared in accordance with the method described in Example 3 except 0.6 mole of reagent was used during etherification. The product was neutralized to pH 5 with HCl and thereafter roll-dried under steam pressure of 140 p.s.i. (345° F.). The roll-dried product possessed the same flocculating activity as the product did before roll drying.

We claim:

1. A process for flocculating materials suspended in aqueous systems which comprises adding to the system the cationic starch ether of claim 3.

2. A process for preparing noncross-linked nitrogen containing cationic starch ethers having a high capacity for flocculating materials suspended in aqueous systems, which comprises (1) gelatinizing starch and (2) etherifying said gelantinized starch, in contact with an alkaline catalyst, with the reaction product of epihalohydrin and a compound from the group consisting of tertiary amines and tertiary amine inorganic salts, said reaction product being substantially free of unreacted epihalohydrin and being represented by the formula:

wherein X is from the group consisting of 2,3-epoxypropyl and 3-halo-2-hydroxypropyl, and wherein $R_1$, $R_2$ and $R_3$ are radicals that total not more than 14 carbon atoms from the group consisting of alkyl, aryl, aralkyl, and cyclic formed by joining 2 R's, as previously defined, and when all 3 R's are not the same and any R contains more than 3 carbon atoms, then the other 2 R's are each an alkyl group not larger than ethyl and when 2 R's are joined to form a ring, then $R_3$ is an alkyl group not larger than ethyl; said cationic starch ether having a D.S. of about 0.18 to 0.66 and a fluidity value when pasted ranging from thick boiling to 80 fluidity.

3. A noncross-linked nitrogen containing cationic starch ether having a high capacity for flocculating materials suspended in aqueous systems prepared by (1) gelatinizing starch and (2) etherifying said gelatinized starch in contact with an alkaline catalyst with the reaction product of epihalohydrin and a compound selected from the group consisting of tertiary amines and tertiary amine inorganic salts, said reaction product being substantially free of unreacted epihalohydrin and being represented by the formula:

wherein X is from the group consisting of 2,3-epoxypropyl and 3-halo-2-hydroxypropyl, and wherein $R_1$, $R_2$ and $R_3$ are radicals that total not more than 14 carbon atoms from the group consisting of alkyl, aryl, aralkyl, and cyclic formed by joining 2 R's as previously defined, and when all 3 R's are not the same and any R contains more than 3 carbon atoms, then the other 2 R's are each an alkyl group not larger than ethyl and when 2 R's are joined to form a ring, then $R_3$ is an alkyl group not larger than ethyl; said cationic starch ether having a D.S. of about 0.18 to 0.66 and a fluidity value when pasted ranging from thick boiling to 80 fluidity.

References Cited in the file of this patent

UNITED STATES PATENTS

| | | |
|---|---|---|
| 2,773,057 | Hjermstad | Dec. 4, 1956 |
| 2,813,093 | Caldwell | Nov. 12, 1957 |
| 2,876,217 | Paschall | Mar. 3, 1959 |

FOREIGN PATENTS

| | | |
|---|---|---|
| 760,869 | Great Britain | Nov. 7, 1956 |

UNITED STATES PATENT OFFICE
CERTIFICATE OF CORRECTION

Patent No. 2,995,513                                       August 8, 1961

Eugene F. Paschall et al.

It is hereby certified that error appears in the above numbered patent requiring correction and that the said Letters Patent should read as corrected below.

Column 3, line 16, for "and" read -- any --; column 4, line 51, for "either" read -- ether --; line 74, for "iliquot" read -- aliquot --.

Signed and sealed this 5th day of December 1961.

(SEAL)
Attest:

ERNEST W. SWIDER                                      DAVID L. LADD
Attesting Officer                                         Commissioner of Patents

USCOMM-DC